US006636142B2

(12) United States Patent
Geier et al.

(10) Patent No.: US 6,636,142 B2
(45) Date of Patent: Oct. 21, 2003

(54) SENSOR ELEMENT, IN PARTICULAR A TEMPERATURE SENSOR

(75) Inventors: Heinz Geier, Leonberg (DE); Gert Lindemann, Lichtenstein (DE); Friederike Lindner, Gerlingen (DE); Thomas Brinz, Bissingen unter der Teck (DE); Ulrich Eisele, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/980,472

(22) PCT Filed: Feb. 24, 2001

(86) PCT No.: PCT/DE01/00721
§ 371 (c)(1),
(2), (4) Date: Nov. 30, 2001

(87) PCT Pub. No.: WO01/75408

PCT Pub. Date: Oct. 11, 2001

(65) Prior Publication Data

US 2003/0006876 A1 Jan. 9, 2003

(30) Foreign Application Priority Data

Apr. 1, 2001 (DE) .......................................... 100 16 415

(51) Int. Cl.[7] .................................................. H01C 1/04
(52) U.S. Cl. .......................................... 338/25; 338/28
(58) Field of Search ..................................... 338/25, 28

(56) References Cited

U.S. PATENT DOCUMENTS

| 4,146,957 | A | * | 4/1979 | Toenshoff | 338/25 |
| 4,332,081 | A | * | 6/1982 | Francis | 29/612 |
| 4,400,684 | A | * | 8/1983 | Kushida et al. | 338/25 |
| 4,517,545 | A | * | 5/1985 | Merz | 338/25 |
| 5,202,665 | A | * | 4/1993 | Hafele | 338/25 |
| 5,823,680 | A | * | 10/1998 | Kato et al. | 374/185 |
| 5,831,512 | A | * | 11/1998 | Wienand et al. | 338/25 |
| 6,297,723 | B1 | * | 10/2001 | Shoji et al. | 338/28 |

FOREIGN PATENT DOCUMENTS

| DE | 1146991 | * | 4/1959 | 338/308 |
| DE | 196 36 493 | | 3/1998 | |
| DE | 196 51 454 | | 6/1998 | |

OTHER PUBLICATIONS

Fefrowitz et al., IBMTDB, V.9, No. 11, p. 1477 (Apr. 1967).*

* cited by examiner

*Primary Examiner*—Karl D. Easthom
(74) *Attorney, Agent, or Firm*—Kenyon & Kenyon

(57) ABSTRACT

A sensor element, especially a temperature sensor (5) is proposed, having a sensitive area (11), whose electrical resistance changes under the influence of a temperature to which the sensitive area (11) is exposed. In this case, sensitive area (11) has a glass ceramic fusion (15) of a starting material containing at least one component which is furnished at least substantially with a surface metallization. The proposed temperature sensor (5) is especially suitable for use at temperatures in excess of 1000° C., at which it shows resistance characteristics like that of a platinum resistor.

1 Claim, 2 Drawing Sheets

SENSOR ELEMENT, IN PARTICULAR A TEMPERATURE SENSOR

The present invention relates to a sensor element, especially a temperature sensor, according to the species defined in the main claim.

BACKGROUND INFORMATION

From German Application DE 196 51 454 A1, an electrical resistor is known, which is made by melting down of metal-coated glass. This produces a network-like metal phase embedded in a glass matrix. This metal phase is formed, for example, of thin platinum metal layers.

From German DE 196 36 493 C1 it is known to seed glass powder with a noble metal salt which is chemically bound to the glass powder surface. From this source it is also known to furnish such a seeded glass powder with a surface metallization having a typical thickness in the nanometer range. From DE 196 36 493 C1 a method is also known for seeding and coating of the metal powder with such a surface metallization.

Finally, temperature sensors are currently being made, in which platinum in the form of a thin layer is vapor-deposited onto a ceramic substrate, the vapor-deposited platinum layer then being trimmed by a laser to the desired resistance value, and being protected by a covering glass layer for use in an exhaust gas. The actual measuring of temperature, using such a temperature sensor, is based on the temperature dependence of the specific electrical resistance of platinum.

SUMMARY OF THE INVENTION

Compared to the related art, the sensor element according to the present invention has the advantage that a temperature sensor can be made from it which is mechanically robust, more cost-effective, and usable, for example, in exhaust gases at temperatures up to 1100° C. At the same time, this temperature sensor demonstrates the same temperature sensitivity as in known platinum resistance temperature sensors, without requiring a costly thin film process for its manufacture, with subsequent overglazing.

Advantageous further refinements of the present invention result from the measures indicated in the dependent claims.

Thus, for realizing the desired temperature dependence of the manufactured temperature sensor, it is especially advantageous to carry out surface metallization in the form of platinum metallization having an average thickness of 0.5 nm to 10 nm, particularly 1 nm to 3 nm.

It is also advantageous that the glass ceramic fusion in the sensitive region of the sensor element according to the present invention can be applied by an ordinary thick layer process onto, for example, a customary ready-made aluminum oxide substrate, and fired in one step at a temperature of ca. 900° C. What is particularly advantageous here is that, because of the adapted heat expansion coefficient of the glass ceramic fusion to the substrate, especially $Al_2O_3$, almost no thermomechanical stresses arise during use.

The design of the sensitive region in the form of a glass ceramic fusion, having a particularly network kind of metal phase embedded in it, further has the advantage that one may do without otherwise customary sintering temperatures of over 1400° C. In the related art, such high temperatures are required when a ceramic, such as $Al_2O_3$ or zirconium dioxide is used, mixed, for instance, with platinum powder, instead of a glass ceramic fusion. Such ceramic powders for forming a desired resistance having platinum characteristics also have the disadvantage, as compared to the glass ceramic fusion used according to the present invention, that platinum layers produced at more than 1400° C. often coagulate, and break up previously formed paths of conduction which guaranteed sufficient electrical conductivity, so that no material having a metallic resistance characteristic can be obtained.

The specific electrical resistance of the produced sensor element can finally be advantageously set by the thickness of the produced surface metallization of a component of the starting material for the glass ceramic fusion.

It is also advantageous that the starting material for producing the glass ceramic fusion product can be melted down at 850° C. to 950° C., refractory phases developing after crystallization, which are then stable at temperatures up to greater than 1000° C. and adapted to $Al_2O_3$ in their heat expansion coefficient. The glass ceramic fusion product thus produced is, furthermore, electrically insulating even at high temperatures, provided a surface metallization of the component of the starting material is not used. Thus, it has, for example, an electrical breakdown resistance of more than 10 kV/mm at 800° C.

For electrical contacting and for producing supply lines to the glass ceramic fusion product, a glass ceramic fusion product can also be advantageously used, however, having a modified composition, and thus having modified resistance characteristics. Alternatively, a conventional, low ohm electrode paste is also suitable for developing the supply lines and contacting.

In order to thermally decouple the temperature-sensitive area of the sensor element from the substrate lying below it, it is further advantageous to provide an intermediate layer between the glass ceramic fusion product and the substrate. For that purpose, preferably an intermediate layer of glass ceramic is used, having the same composition as the starting material for the glass ceramic fusion product in the sensitive area of the sensor element, however, doing without a surface metallization of a component of this starting material. In this respect the intermediate layer is electrically insulating.

Using such an intermediate layer has the advantage that thereby, at least to a great extent, measuring value falsification of the sensor element's measuring values, caused by heat discharge from the sensitive area in the direction of the substrate, can be avoided. This happens because the intermediate layer has a substantially lower heat conductivity compared to the substrate made of $Al_2O_3$.

BRIEF DESCRIPTION OF THE DRAWINGS

The present invention is explained in greater detail on the basis of the drawing and the following description.

EXEMPLARY EMBODIMENTS

Figure 1:
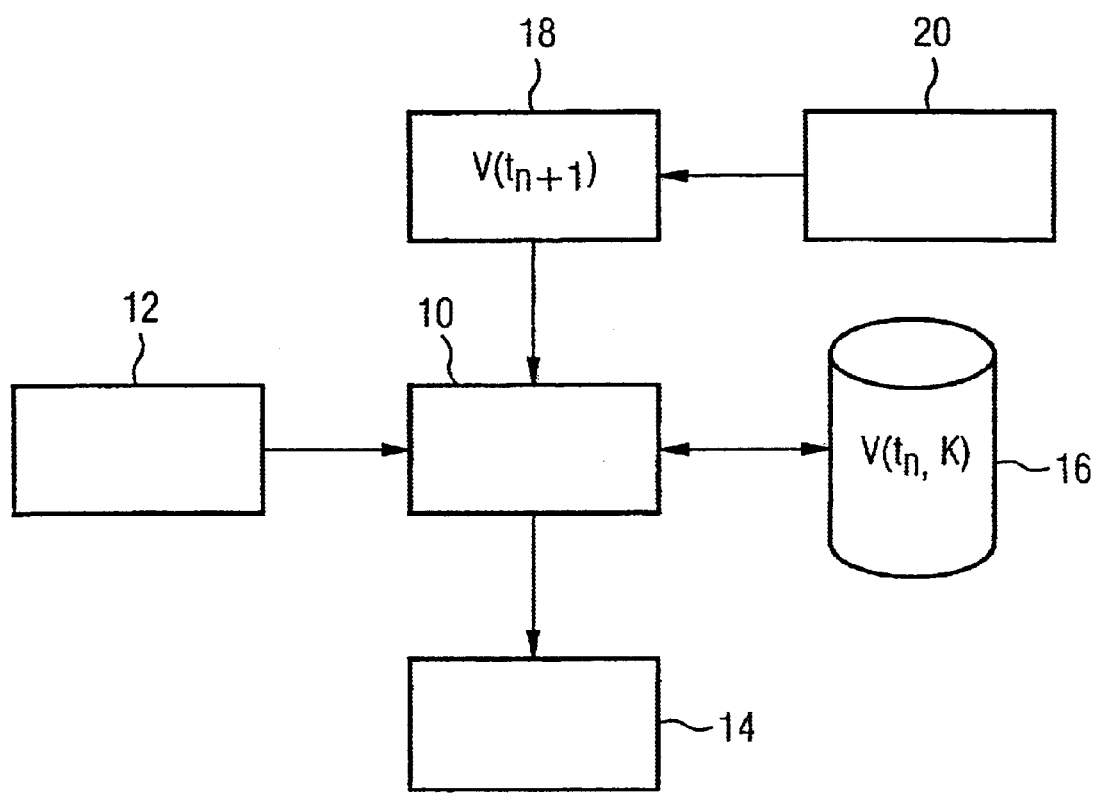
FIG. 1 shows a first exemplary embodiment of a temperature sensor in top view and FIG. 2 shows a second exemplary embodiment of a temperature sensor in cross section.

A glass powder is first prepared, molten from an initial powder containing silicon dioxide, aluminum oxide, titanium dioxide, sodium oxide, potassium oxide and calcium oxide. In detail, the starting powder contains 38 weight % to 48 weight % $SiO_2$, 15 weight % to 19 weight % $Al_2O_3$, 4.5 weight % to 10 weight % $TiO_2$, 0.1 weight % to 1.5 weight % $Na_2O$, 0.1 weight % to 1.5 weight % $K_2O$ and 23 weight % to 30 weight % CaO.

Preferably the starting powder contains 45 weight % $SiO_2$, 17 weight % $Al_2O_3$, 9 weight % $TiO_2$, 0.5 weight % $Na_2O$, 0.5 weight % $K_2O$ and 28 weight % CaO.

After a glass has been molten to begin with, in a manner known per se, from this starting powder, this glass is ground to a glass powder having an average particle size of 1 μm to 20 μm, especially 2 mum to 10 mum. In the explained exemplary embodiment, the average particle size is 5 μm.

Thereafter, the glass powder thus produced is furnished with a surface metallization of platinum. For this purpose, the glass powder is first seeded, in the manner known from DE 196 36 493 C1, with a noble metal salt bound chemically to the surface of the glass powder particles. Subsequently, the glass powder thus seeded is coated with a platinum metal layer in the form of a surface metallization by currentless metallizing. This currentless metallizing is also performed in the manner known from DE 196 36 493 C1, by metallizing the known seeded glass powder in a currentless manner in a bath containing a platinum salt and a reducing agent. The result of the performed surface metallization of the applied glass powder is thus a glass powder in which the surface of the individual glass powder particles are at least extensively supplied with platinum metallization.

The thickness of the surface metallization thus applied, which essentially determines the specific electrical resistance of the glass ceramic fusion subsequently obtained, is on average 0.5 nm to 10 nm, especially 1 nm to 3 nm. In the explained example, in order to set a resistance of 500 Ω, an average thickness of the surface metallization of ca. 2 nm is applied.

Now, after the applied glass powder has been furnished with the surface metallization of platinum in the manner explained, it is processed into a first thick-film paste. To do that, a binder such as cellulose and a solvent such as terpineol are added to the metallized glass powder.

Besides the first thick-film paste prepared in this manner, a second thick-film paste is then produced for manufacturing printed circuit traces for the electrical contacting of the glass ceramic meltdown to be subsequently produced, in the sensitive range of the temperature sensor to be manufactured. This second thick-film paste contains a mixture of the starting powder for the first thick-film paste already explained with a metal powder, especially a palladium powder. Beyond that, the above-named binder and the above-named solvent are also added to this second thick-film paste. Thus, all in all, the second thick-film paste for producing the printed circuit traces differs from the first thick-film paste for producing the glass ceramic meltdown in the sensitive range of the temperature sensor only in that, in the case of the second thick-film paste, surface metallization of the applied glass powder was eliminated, and instead of that, a palladium powder was directly added to the second thick-film paste.

FIG. 1 shows a known ready-made substrate of $Al_2O_3$ in the form of a chip on whose surface printed circuit traces 12 and connecting contact areas 13 have been printed in a known manner. For this, the second thick-film paste described above was applied. The width of the printed circuit traces 12 is typically 10 μm to 100 μm, their thickness lies between 1 μm and 10 μm. Subsequently, in a sensitive area 11 on substrate 10, the first thick-film paste was printed on together with the glass powder furnished with a surface metallization. The sensitive area 11 of the sensor element formed as temperature sensor 5 in the explained example, in this case is that area, whose electrical resistance changes under the influence of an outer temperature to be measured. In particular, this sensitive area 11 is exposed to a hot exhaust gas when the explained temperature sensor 5 is applied to catalyst monitoring or engine regulation. The size of sensitive area 11 in the explained example lies at a length of ca. 5 mm, a width of ca. 0.1 μm and a height of ca. 30 μm. Thus the extent of sensitive area 11 is defined by the size of the first area on substrate 10 printed upon with the first thick-film paste. After the supply leads 12, on the one hand, are imprinted and, in the sensitive area 11, across the supply leads 12, the first thick-film paste is imprinted, which is subsequently supposed to form a glass ceramic fusion 15, substrate 10, thus imprinted, is now submitted to heat treatment at temperatures from 850° C. to 950° C. During this process, glass ceramic fusions form from the imprinted thick-layer pastes, i.e. fusion of the glass powder in the starting material takes place, and simultaneously refractive phases crystallize out which are temperature stable up to over 1000° C., and are adapted in their heat expansion coefficient to substrate 10 made of $Al_2O_3$.

Thus, on the one hand, during this temperature treatment, in sensitive area 11, a glass ceramic fusion 15 is formed which has a metal phase of platinum, formed particularly network-like and embedded in a glass ceramic matrix. During the temperature treatment there is also formed simultaneously, in the area of the supply leads 12, another glass ceramic fusion from the second thick-film paste imprinted there, which has a metallic phase of palladium embedded in a glass ceramic matrix. Thus, altogether a sensor element in the form of a temperature sensor 5 is formed, which has at least substantially the characteristics of the specific electrical resistance such as that of customary platinum resistors (Pt100 or Pt200 elements).

In this connection, it should further be emphasized that the supply leads 12 can also be produced by way of imprinting a conventional low-ohm electrode paste, as an alternative to being made as glass ceramic fusion as in the specific embodiment explained. In this respect, it is only necessary, in the explained exemplary embodiment, that glass ceramic fusion 15 in the sensitive area 11 be executed in the manner explained above. However, with a view to the actual production of supply leads 12 and also of the connecting contact surfaces 13, respectively, methods already known from the related art can be used, which do not absolutely require the generation of a glass ceramic-metal mixed structure as the one explained above.

Figure 2:
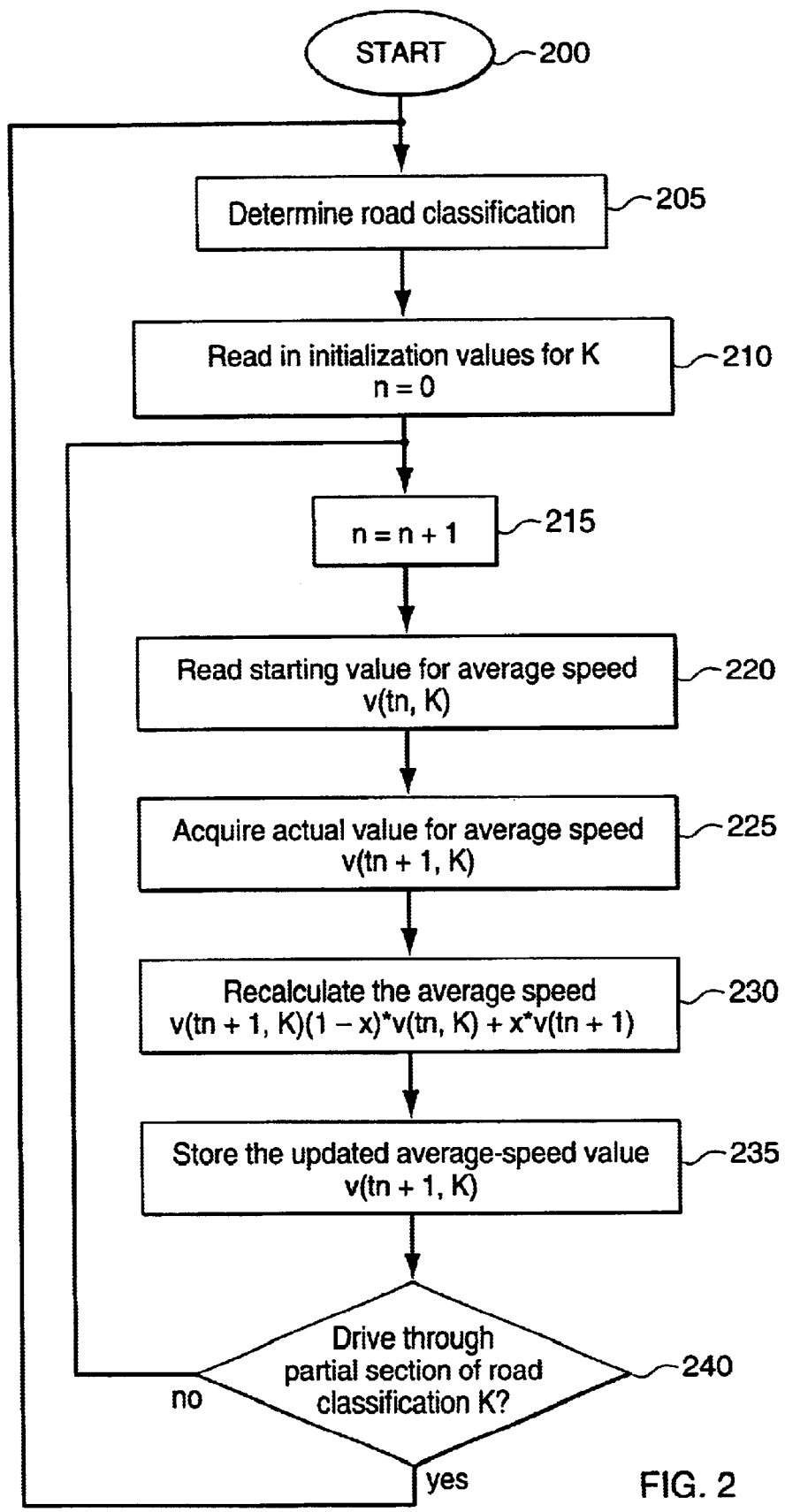
Figure 1:
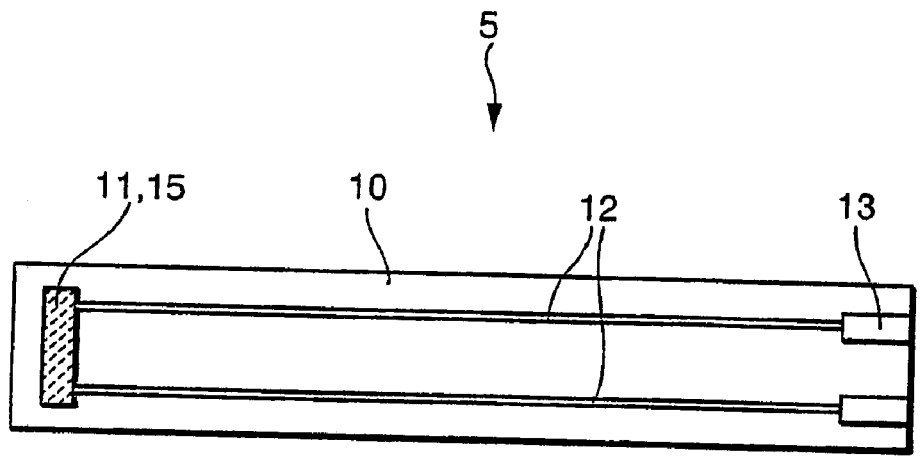
Figure 2:
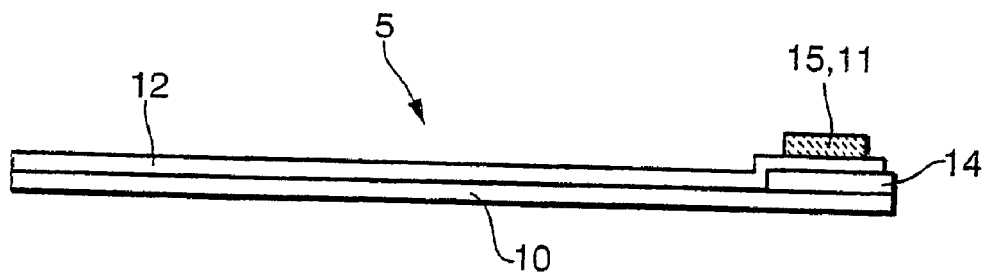

FIG. 2 shows a further exemplary embodiment of a sensor element in the form of a temperature sensor 5, which differs from the exemplary embodiment according to FIG. 1 only in that at least in the sensitive area 11 an additional intermediate layer 14 is provided between the generated glass ceramic fusion 15 and substrate 10. This intermediate layer 14 has a thickness, for example, of 20 μm to 100 μm, and is used for thermally decoupling glass ceramic fusion 15 from substrate 10. In this respect it is necessary that intermediate layer have a substantially lower heat conductivity than substrate 10, $Al_2O_3$ in the explained example.

For producing intermediate layer 14, once again the starting material is used, that was used for producing the glass ceramic fusion 15 with the glass powder explained there. However, the surface metallization of the glass powder is omitted here, which means, that the glass powder is processed with the binder and the solvent to a third thick-film paste, which does not contain any component furnished with surface metallization and does not have any added metal powder either.

Thus, in the exemplary embodiment according to FIG. 2, intermediate layer 14 is first of all imprinted on substrate 10 in sensitive area 11. After that, and fully analogous to the exemplary embodiment according to FIG. 1, the printed circuit traces 12 are imprinted on substrate 10 and the connecting contact surfaces 13 are generated. This imprinting of the printed circuit traces 12 is done, in this case, in such a way that they reach into sensitive area 11, and as a result are imprinted partially onto intermediate layer 14 as well. Following that, the first thick-layer paste is then imprinted in sensitive area 11 across supply leads 12, analogously to the first exemplary embodiment. Finally, substrate 10, thus prepared, is then once again submitted to heat treatment at 850° C. to 950° C., whereupon, on the one hand, glass ceramic fusion 15 develops in the sensitive area 11, which has characteristics of the specific electrical resistance like a platinum resistance element. At the same time, supply leads 12 develop in the form of a glass ceramic-metal mixed construction made of a glass ceramic fusion having a palladium phase. Finally, during this heat treatment, an electrically insulating glass ceramic fusion develops from the third thick-film paste as intermediate layer 14.

What is claimed is:

1. A sensor element, comprising:

a sensitive area having an electrical resistance that changes under an influence of a temperature to which the sensitive area is exposed;

wherein the sensitive area includes a glass ceramic fusion of a starting material containing at least one component that is at least substantially supplied with a surface metallization, and wherein the starting powder contains 38 weight % to 48 weight % $SiO_2$, 15 weight % to 19 weight % $Al_2O_3$, 4.5 weight % to 10 weight % $TiO_2$, 0.1 weight % to 1.5 weight % $Na_2O$, 0.1 weight % to 1.5 weight % $K_2O$, and 23 weight % to 30 weight % CaO.

* * * * *

UNITED STATES PATENT AND TRADEMARK OFFICE
CERTIFICATE OF CORRECTION

PATENT NO. : 6,636,142 B2
DATED : October 21, 2003
INVENTOR(S) : Heinz Geier et al.

It is certified that error appears in the above-identified patent and that said Letters Patent is hereby corrected as shown below:

<u>Title page,</u>
Item [57], ABSTRACT, delete "(5) (11) (11) (11) (15) (5)"

<u>Column 1,</u>
Line 3, insert -- FIELD OF THE INVENTION --
Line 5, change "...sensor, according to the species defined in the main claim." to
-- ...sensor. --
Line 10, change "From German Application DE 196 51 454 A1, an electrical resistor is known," to -- German Published Patent Application No. 196 51 454, an electrical resistor --
Line 15, change "From German DE 196 36 493 C1 it is known to seed" to -- German Patent No. 196 36 493 describes the seeding of --
Line 20, change "From DE 196 36 493 C1 a method is also known for" to -- German Patent No. 196 36 493 describes a method for --
Lines 43-45, delete "Advantageous...dependent claims."

<u>Column 2,</u>
Line 50, delete "The present invention...following description."
Line 53, change "top view and FIG. 2" to -- top veiw. FIG. 2 --
Line 56, change "EXEMPLARY EMBODIMENTS" to
 -- DETAILED DESCRIPTION --

<u>Column 3,</u>
Line 9, change "DE 196 36 493 C1," to -- German Patent No. 196 36 493, --
Line 14, change "DE 196 36 493 C1" to -- German Patent No. 196 36 493 --

UNITED STATES PATENT AND TRADEMARK OFFICE
CERTIFICATE OF CORRECTION

PATENT NO. : 6,636,142 B2
DATED : October 21, 2003
INVENTOR(S) : Heinz Geier et al.

It is certified that error appears in the above-identified patent and that said Letters Patent is hereby corrected as shown below:

<u>Column 4,</u>
Line 34, delete "it is only necessary, in"
Line 35, delete "explained exemplary embodiment, that"
Line 36, change "be executed" to -- is executed --
Line 52, delete "it is necessary that"
Line 53, change "have" to -- has --

Signed and Sealed this

Twenty-eighth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,636,142 B2
DATED : October 21, 2003
INVENTOR(S) : Heinz Geier et al.

It is certified that error appears in the above-identified patent and that said Letters Patent is hereby corrected as shown below:

<u>Drawings,</u>
Sheet 1 of 2, delete Fig. 1, and replace with Figs. 1 and 2 attached;
Sheet 1 of 2, delete "Sheet 1 of 2" and replace with -- Sheet 1 of 1 --; and
Sheet 2 of 2, delete in its entirety.

Signed and Sealed this

Eighteenth Day of October, 2005

JON W. DUDAS
*Director of the United States Patent and Trademark Office*